Dec. 12, 1944.    D. R. STAMY ET AL    2,364,671
TANK HATCH HOOD
Filed June 18, 1942    4 Sheets-Sheet 1

INVENTORS
DAVID R. STAMY, CHARLES E. FISHER,
JOHN R. FINN
BY
*Hyde and Meyer*
ATTORNEYS Dec. 12, 1944.   D. R. STAMY ET AL   2,364,671
TANK HATCH HOOD
Filed June 18, 1942   4 Sheets-Sheet 3

INVENTORS
DAVID R. STAMY, CHARLES E. FISHER,
JOHN R. FINN
BY
*Hyde and Meyer*
ATTORNEYS

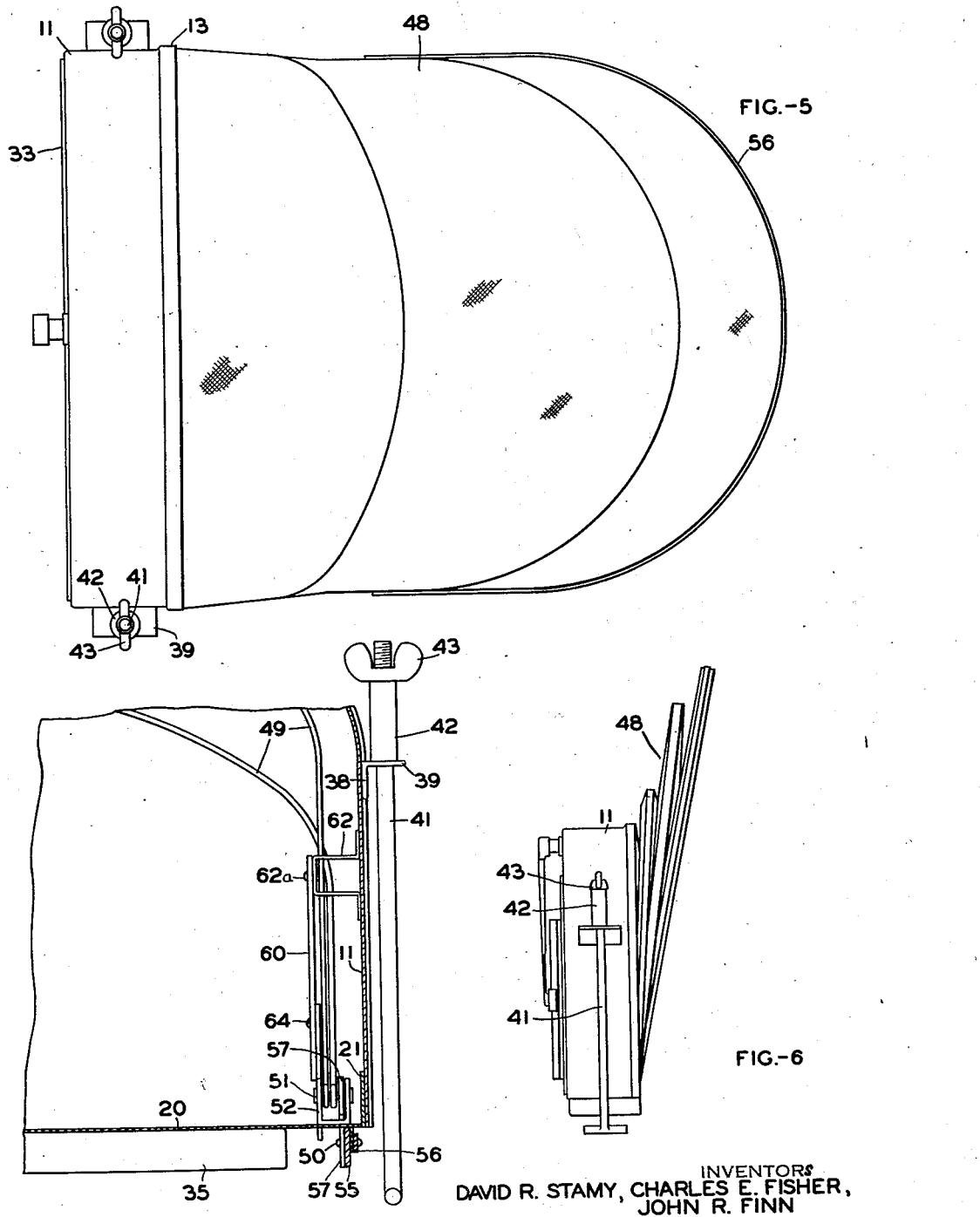

Patented Dec. 12, 1944

2,364,671

UNITED STATES PATENT OFFICE 2,364,671

TANK HATCH HOOD

David R. Stamy, Huntington Woods, Charles E. Fisher, Detroit, and John R. Finn, Dearborn, Mich., assignors to The Standard Products Company, Detroit, Mich., a corporation of Ohio Application June 18, 1942, Serial No. 447,550

2 Claims. (Cl. 296—110)

The invention relates to a novel and improved removable hood or cover for an aperture such as a hatch, manhole, or the like and more particularly to a hood or cover of this nature which can be readily folded, detached from operating position, and carried within said hatch or manhole, the whole operation being performed by an operator within the hatch.

The invention is particularly adapted for use as a detachable observation hood for the hatch of an armored tank, or for similar use in connection with armored emplacements, observation posts, or the like. The invention will be illustrated and described with specific reference to its application for an armored tank hatch.

When in actual combat, or when an attack is anticipitated, the hatch opening of a tank is closed by an armored shutter, or other protective shield with which the present invention is not concerned. The invention here involved deals with a detachable hood structure for use during noncombat conditions such as practice maneuvers, or when the tank is being driven from one location to another.

An object of the invention is to provide a novel and improved collapsible hood or cover for a hatch aperture.

Another object of the invention is to provide a hood or cover of the nature described which can be rapidly attached or detached by an operator from within the tank or other enclosure.

A further object of the invention is to provide a hood or cover which, when collapsed and detached in the manner to be described, may be readily withdrawn through the hatch opening for storage within the tank, or the like.

Further objects and advantages of the present invention will be apparent on consideration of the following description of one embodiment thereof, taken in conjunction with the accompanying drawings, in which Fig. 1 is a front elevation of the upper, exterior portion of an armored tank hatch, showing applied thereto a hatch hood or cover of the type herein involved.

Fig. 5 is a top plan view of the hood in the condition shown in Figs. 1 and 2.

Fig. 6 is a side elevation similar to Fig. 2 but showing the top collapsed and in condition preparatory to demounting, and withdrawal within the hatch.

Fig. 7 is a detailed sectional view, somewhat enlarged, taken on the line 7—7 of Fig. 4.

Figure 1:
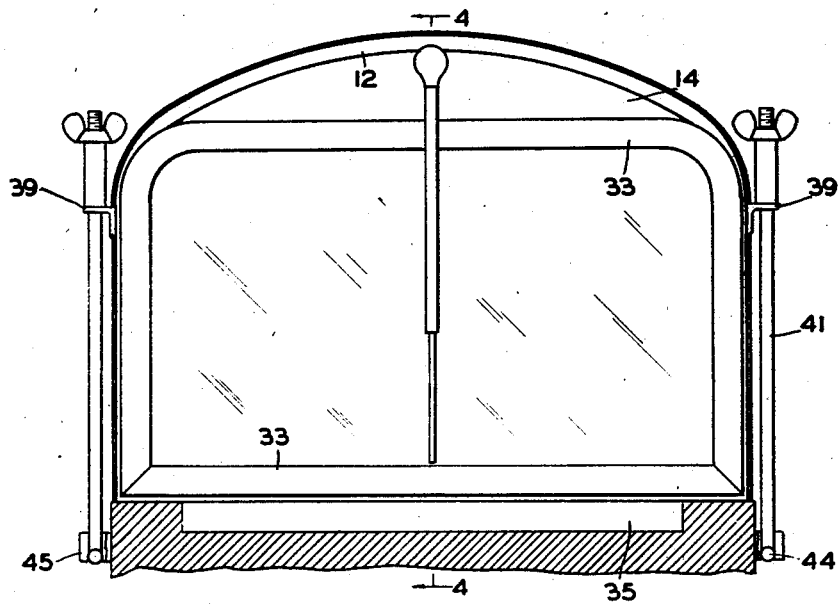

Before the present invention is described in detail, it is to be understood that such invention is not limited to the details of construction or the specific arrangement of parts herein illustrated or described, as the invention obviously may take other forms. It also is to be understood that the phraseology or terminology herein employed is for the purpose of description and not of limitation.

The collapsible and removable hood now to be described comprises a front wall structure, including a transparent windshield member, said structure being normally rigidly attached in a frontal position on the hatch wall, so as to extend substantially vertically upwardly therefrom. When desired, this front wall structure is readily removable, as will appear. The remaining portion of the hood structure comprises gradually merging top, side, and rear portions to produce a hooded or semi-ovoidal contour, of collapsible character, attached to and carried solely by said front wall structure and being foldable into substantially planar registry therewith when not in use.

The front wall comprises an arch-like outer frame member 11 of sheet metal, having an inwardly inclined flange 12 (Fig. 4) around its forwardly directed edge, and a slightly outwardly offset rear edge portion 13. A segmental plate member 14 closes the upper portion of the arch, being welded or otherwise conveniently attached to frame 11. A conventional windshield wiper assembly is carried by said plate 14 and frame 11, the motor 15 being housed behind the plate, within the hood, and the actuating arm 16 and blade 17 being positioned on the exterior in the usual manner. A split collar bracket 18, clamped at 19, encircles the motor 15, the upper bracket portion being welded to the inner surface of frame 11.

The outer frame 11 is carried on a base plate 20 (Figs. 4 and 7), said base plate being provided with a pair of upturned lateral flanges 21 each of which contacts an inner face of said frame and is affixed thereto in any suitable manner. Plate 20 is likewise provided with an upturned flange 22 running transversely along its front edge.

Figure 3:
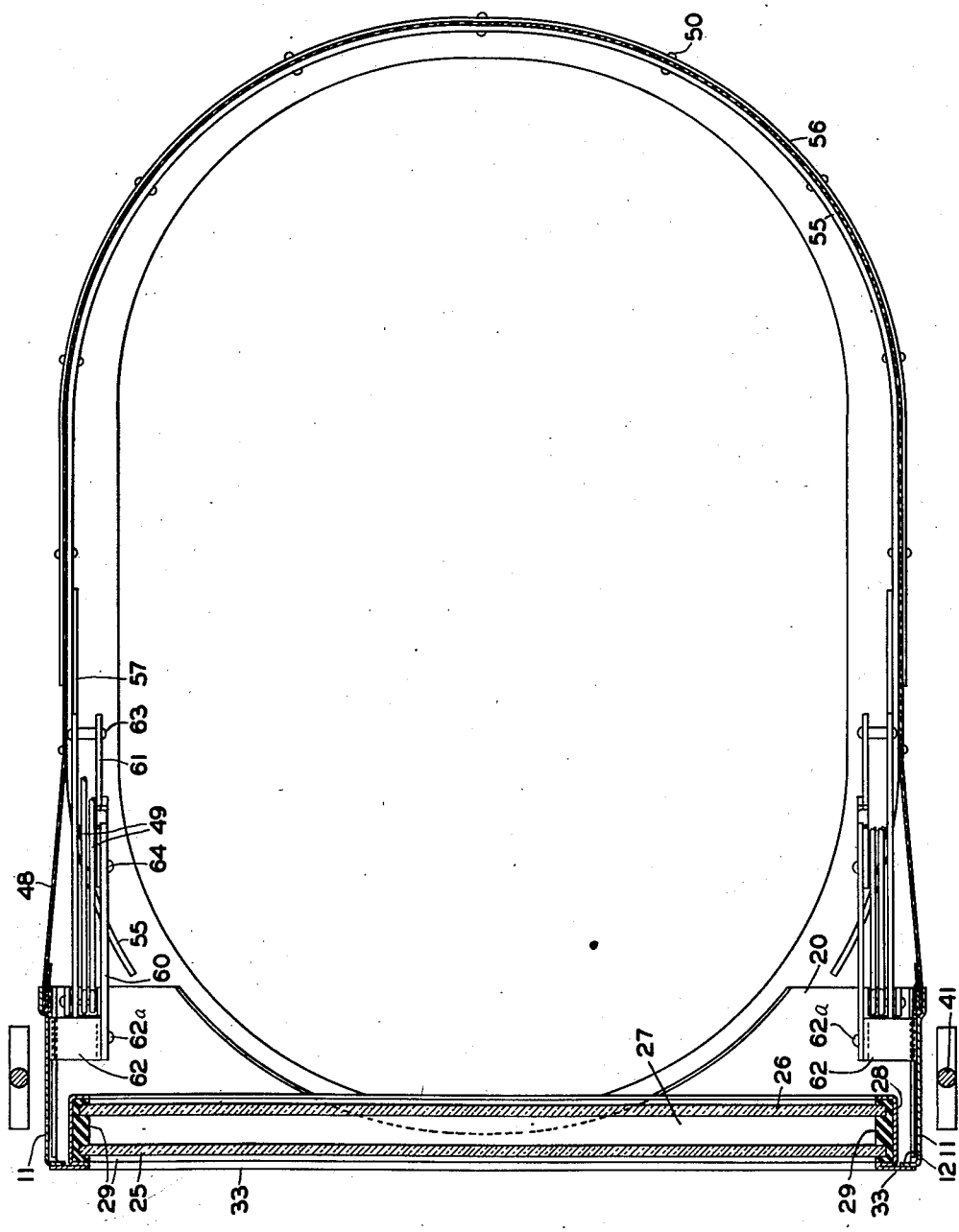
Fig. 3 is a horizontal section taken on the line 3—3 of Fig. 2.

A windshield unit is provided, comprising transparent plates 25 and 26 (Figs. 3 and 4) which are disposed in parallel, spaced relationship so as to include therebetween an air space 27. The plates are carried in a frame structure 28 of channel-like contour, said frame being provided with a spacing gasket 29 having peripheral internal grooves 30 for proper retention of the plate edges therein. The frame may be transversely split at convenient opposed points, or otherwise, to facilitate assembly of the windshield unit.

The frame 28, just described, is carried within the opening which is bounded at the top by plate 14, at the bottom by flange 22, and at the sides by flanges 12. For convenience in mounting, frame 28 is in the present embodiment provided with a peripheral attaching flange 33 (Figs. 1 and 4) formed by a reverse bending of one of the legs of the channeled portion of the frame. Flange 33 is riveted or otherwise secured to flanges 12 and 22 and plate 14.

A crescent shaped base bracket 35 of channeled sectional contour is affixed to the under side of base plate 20. It is complementary in contour to an abutment 36 (Fig. 4) on the tank hatch, and it is fabricated to a size and shape suited to fit such abutment.

The arch-like frame member 11 is provided with a pair of opposed attaching brackets 38 (Figs. 1, 2 and 7) affixed on the upper, outer surface of the vertical legs of the arch. An outturned portion 39 of each bracket 38 is provided with a perforation adapted to receive the upper end of an attaching bolt 41. The upper end of said bolt 41 is conventionally threaded, and provided with a spacer or washer 42, and a wing nut 43. The lower end of bolt 41 is provided with headed means 44 adapted to seat below paired lugs 45 (Fig. 2) on the tank hatch. It is obvious that by inserting the lower headed end of bolt 41 within suitably undercut recesses in the lower surfaces of lugs 45 and tightening the wing nuts, the windshield assembly may be rapidly and securely attached by an operator and, when the collapsible portion of the hood is opened by an operator within the hatch (as will appear) the whole assembly may be demounted from within.

The hood structure herein disclosed is provided with a collapsible or folding top 48, which, when in operative position, extends rearwardly from the windshield assembly just described, and is carried by said assembly. The top is formed from fabric material or other foldable relatively weatherproofed substance and is internally braced by one or more supporting struts or ribs 49 (Figs. 4 and 7) of U-shaped contour, pivoted around a pivot pin which may conveniently be the shank of a rivet 51 carried by the legs 52 of a bracket affixed to base plate 20.

The lower peripheral edge of top 48 is gripped between complementary internal and external metal straps 55 and 56 by means of rivets 50 which extend through the straps and the fabric retained therebetween. A supporting arm 57 (Fig. 4) is pivoted at one end on pin 51, and at its other end is spot welded to the said strap 55. A pair of complementary metal toggle arms 60 and 61 provide a brace on each side of the top to maintain it in fully extended position. Toggle arm 60 is pivoted at 62a on a bracket 62 carried by the windshield assembly, and arm 61 is pivoted at 63 to supporting arm 57. The said arms 60 and 61 are mutually pivoted at 64 in familiar toggle fashion. Arm 60 is provided with a lug 65 and arm 61 with a recess 66, said lug and recess cooperating to constitute stop means to prevent the toggle from passing center in the wrong direction.

Figure 4:
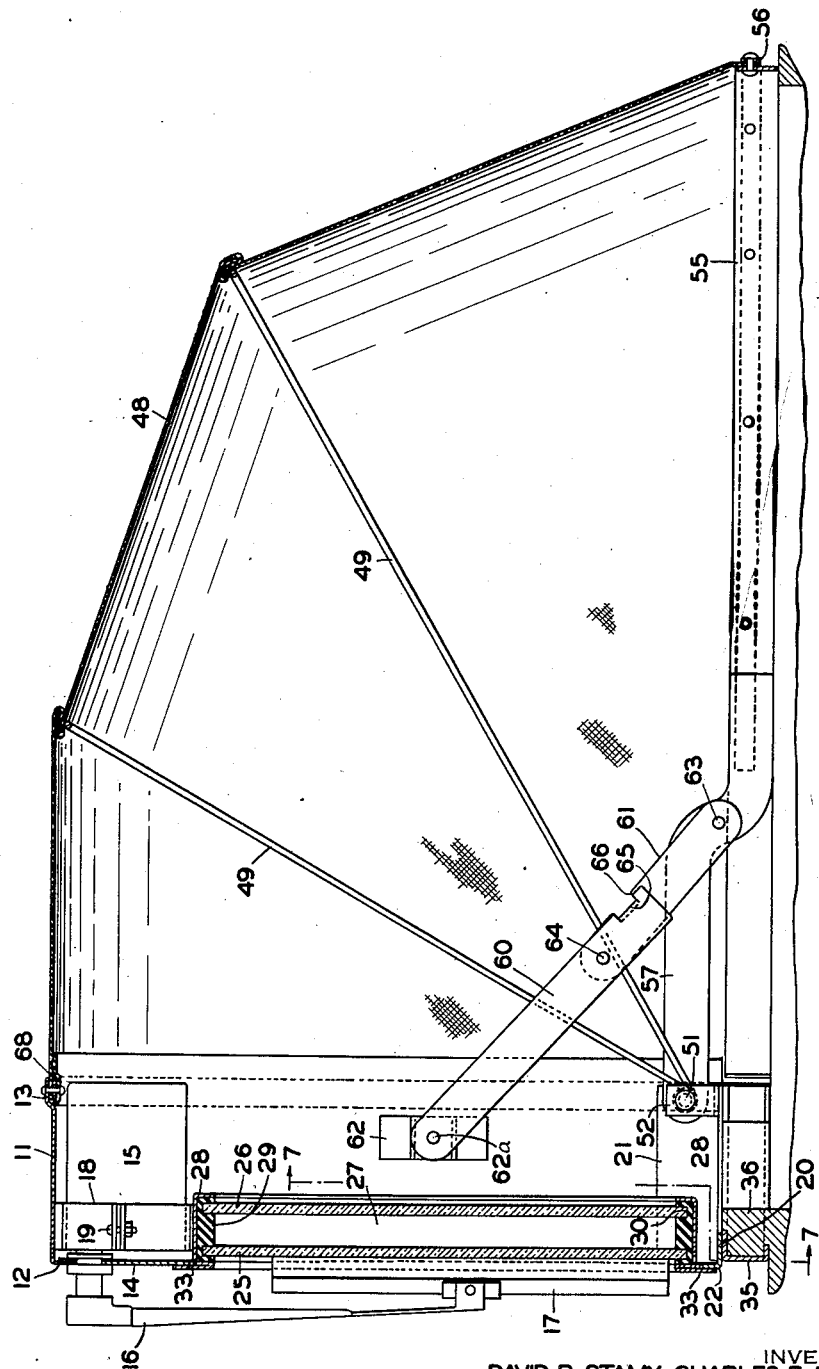
Fig. 4 is a longitudinal, vertical section taken on the line 4—4 of Fig. 1.

Around its front, arched periphery the top is provided with a reinforcing metal strap 68 (Fig. 4). The fabric of the top may be wrapped around strap 68 and the assembled edge portion is then securely attached within the rear edge 13 of housing 11 by riveting or otherwise.

Figure 2:
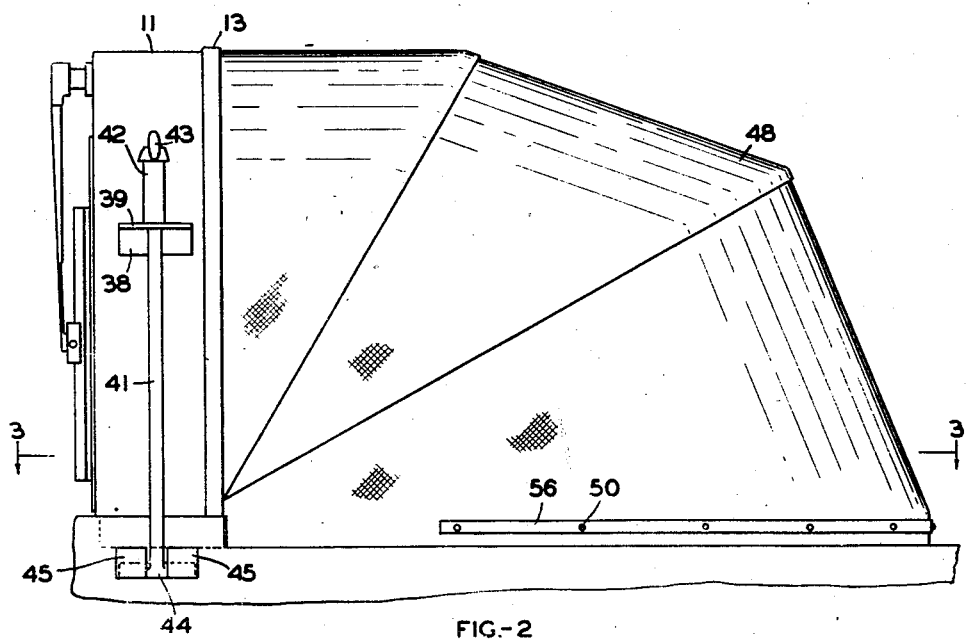
Fig. 2 is a side elevation of the hood or cover, in attached, operating position.

Assuming that the hood is in operative position, as shown in Figs. 2 and 5 for example, and it is desired to collapse the top partially or remove it completely, the operator within the tank or other enclosure proceeds as follows. The toggle brace is first relaxed by pulling upwardly on pivot 64 of arms 60 and 61. The lower rear edge of the top may then be lifted, progressively collapsing the top in familiar fashion, and swinging the folded top to an upright position above and around the windshield assembly. The top may be retained in this position by a conventional flexible strap and snap fastener (not shown). The operator then gives wing nuts 43 several turns to release the lower headed portion of bolt 41, after which the complete hood assembly including windshield, top, and attaching bolts may be lifted within the hatch. If actual combat or maneuver conditions are contemplated, the hatch opening may then be shielded by an armored shutter or by other protective means, as desired.

Substantially all of the metal parts described hereinabove may be fabricated from sheet metal, by pressing or stamping operations, thereby combining sufficient strength and rigidity with ease of manufacture and assembly, and likewise providing a hood which is light enough to be readily manipulated by a single operator.

What we claim is:

1. A removable cover for an aperture in an armored tank hatch wall, said cover being adapted to be attached or demounted by an operator within said hatch, said cover having a front wall structure comprising a base member, an arch-like frame element carried by said base member, and a windshield unit supported within said frame element, a collapsible top extending rearwardly from said front wall structure, said top having a front arched edge portion and a bottom peripheral edge portion, said front edge portion being fixedly attached to said arch-like frame element, and said bottom peripheral edge portion having edge reinforcing means pivotally attached to said front wall assembly, an upright outer portion of said arch-like frame element having on its external surface a projection, an elongated bolt member removably depending from said projection and having on its upper end adjustable attaching means for retaining it in said depending relationship, the lower end of said bolt having a laterally offset portion thereon, and a lug on said tank hatch wall adapted to engage the said offset portion of said bolt whereby said cover is removably retainable on said tank hatch wall.

2. A removable cover for an aperture in an armored tank hatch wall, said cover being adapted to be attached or demounted by an operator within said hatch, said cover having a front wall structure comprising a base member, an arch-like frame element carried by said base member, and a windshield unit supported within said frame element, a collapsible top extending rearwardly from said front wall structure, said top having a front arched edge portion and a bottom peripheral edge portion, said front edge portion being fixedly attached to said arch-like frame element, and said bottom peripheral edge portion having edge reinforcing means pivotally attached to said front wall assembly, an upright outer portion of said arch-like frame element having on its external surface a projection, adjustable attachment means depending from said projection, and additional attaching means on said tank hatch wall adapted to engage said adjustable attaching means whereby said cover is removably retainable on said tank hatch wall.

DAVID R. STAMY.
CHARLES E. FISHER.
JOHN R. FINN.